Patented June 5, 1934

1,961,542

UNITED STATES PATENT OFFICE 1,961,542

PROCESS FOR THE MANUFACTURE OF ACETIC ANHYDRIDE

Jan Al, Amsterdam, Netherlands, assignor to Naamlooze Vennootschap De Bataafsche Petroleum Maatschappij, The Hague, Netherlands No Drawing. Application July 23, 1930, Serial No. 470,236. In Great Britain August 9, 1929

3 Claims. (Cl. 260—123)

My invention relates to the manufacture of acetic anhydride from acetic acid and acetone.

According to my invention said anhydrides are prepared by subjecting mixtures of organic acids and ketones or ketone forming substances to the action of elevated temperatures.

All kinds of organic acids, mono-, and di-, as well as polybasic acids, may be used and also mixtures of such acids.

Also ketones with more than one carbonyl (CO) group may be used.

An example of a ketone forming substance is isopropyl alcohol which yields acetone on being passed over porcelain pieces at 600–700° C.

The following equations serve to illustrate examples of reactions which may be effected according to the invention.

(1)

$$CH_3COCH_3 + CH_3COOH \rightarrow CH_3CO-O-COCH_3 + CH_4$$

(2)

$$2CH_3COCH_3 + COOH(CH_2)_4COOH \rightarrow 2CH_4 + CH_3CO-O-CO(CH_2)_4CO-O-COCH_3$$

(3)

$$2CH_3COOH + CH_3CO(CH_2)_4COCH_3 \rightarrow 2CH_4 + CH_3CO-O-CO(CH_2)_4CO-O-COCH_3$$

A preferred form of carrying out the process of my invention consists in causing an organic acid to react with the corresponding ketone so as to yield the corresponding acid anhydride (compare Equation 1).

The reaction may be carried out with or without the aid of pressure or of vacuum and in the presence or absence of suitable catalysts. For instance it is possible to carry out the reaction by conducting the mixture of acid and ketone through a tube made of any suitable material in the presence of filling and/or contact masses. The filling masses may serve for obtaining the desired state of flow, whereas the contact masses may have a catalytic influence on the reaction.

The contact masses may serve at the same time to act as a filling material or the latter may constitute the carrier of the catalyst.

The following example serves to illustrate the nature of my invention.

A mixture of 1 part by volume of acetic acid and 4 parts by volume of acetone were at a temperature of 700° C. and at a velocity of 5 to 7 cc. per minute passed through a tube made of porcelain and filled with pieces of crushed porcelain. Using 360 ccs. (304 Gr.) of the aforesaid mixture, the reaction products consisted of a liquid weighing 271 grams and 41.1 litres (at 25° C.) of gas weighing 34.7 grams.

The gas consisted of 66.2% methane, the rest being a mixture of $CO_2$, CO, $C_2H_4$ and $H_2$.

The liquid after fractionation up to a temperature of 105° C. yielded 171 grams of a liquid consisting of 157.2 grams of acetone and 13.8 grams of acetic acid. The residue after the fractionation weighing 96 Gr. was a mixture of acetic anhydride (62.6%), acetic acid (34.5%) and acetone (2.8%). 48 per cent by weight of anhydride of the theoretically possible quantity was thus obtained.

Experiments have shown that the process according to my invention is particularly suitable for the manufacture of acetic anhydride from acetic acid and acetone.

What I claim is:

1. A method of preparing the anhydride of acetic acid comprising heating a mixture of acetic acid and acetone to temperatures ranging from 600 to 700° C.

2. A method of preparing the anhydride of acetic acid comprising heating a mixture of acetic acid and a substance convertible into acetone under the conditions obtaining to temperatures ranging from 600 to 700° C.

3. A method of preparing the anhydride of acetic acid comprising heating a mixture of acetic acid and a substance convertible into acetone under the conditions obtaining to temperatures ranging from 600 to 700° C. in the presence of porcelain.

JAN AL.